United States Patent
Ransohoff et al.

[15] 3,676,675
[45] July 11, 1972

[54] PRODUCTION IRRADIATOR

[72] Inventors: Jackson A. Ransohoff, Bethesda; Lewis P. Sarkozi, Adamstown, both of Md.

[73] Assignee: Neutron Products, Inc., Dickerson, Md.

[22] Filed: May 29, 1969

[21] Appl. No.: 829,080

[52] U.S. Cl. ............................250/52, 198/85, 250/106 R, 250/106 S
[51] Int. Cl. .................................................G21h 5/00
[58] Field of Search..............198/85; 250/106 R, 52, 106 S

[56] References Cited

UNITED STATES PATENTS

| | | | |
|---|---|---|---|
| 3,142,759 | 8/1964 | Jefferson et al. | 250/106 |
| 3,452,195 | 6/1969 | Brunner | 250/106 |

FOREIGN PATENTS OR APPLICATIONS

| | | | |
|---|---|---|---|
| 476,375 | 9/1969 | Switzerland | 250/52 |

Primary Examiner—James W. Lawrence
Assistant Examiner—D. C. Nelms
Attorney—Sughrue, Rothwell, Mion, Zinn & Macpeak

[57] ABSTRACT

Irradiation of material in packages is carried out continuously by a unique conveyor arrangement which transports closely spaced carriers containing the packages in vertical runs past a radiation source. The radiation conveyor utilizes extension arms to increase the radius of outside turns and allow the carriers to be spaced closer to the source and to each other. A transfer conveyor is provided to obviate the need for inside turns so that individual carriers and adjacent vertical runs may be closely spaced in the radiation zone. A loading station provides means for the horizontal loading and unloading of the packages in increments to provide for the integration of the radiation dose horizontally across the carrier length. An effective labyrinth radiation shield above the source shields the loading station. The radiation dosage per pass through the system may be varied by varying the speed of the conveyor or the strength of the radiation source plaque.

7 Claims, 8 Drawing Figures

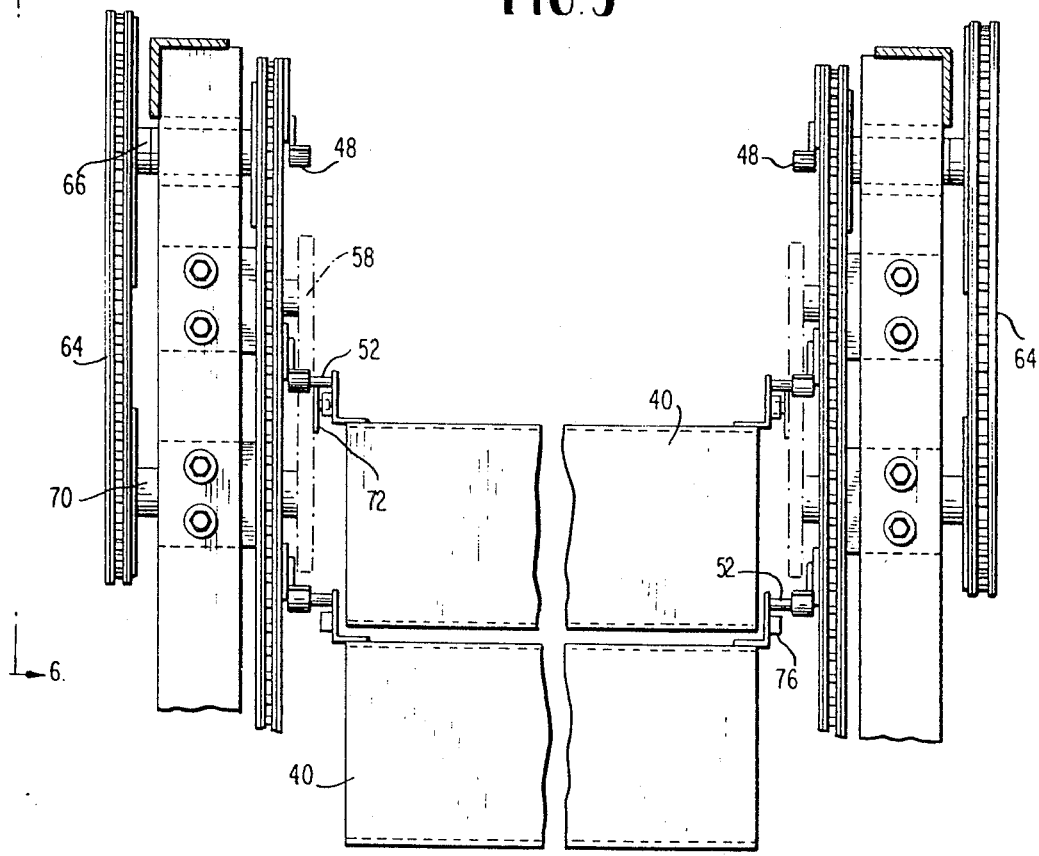
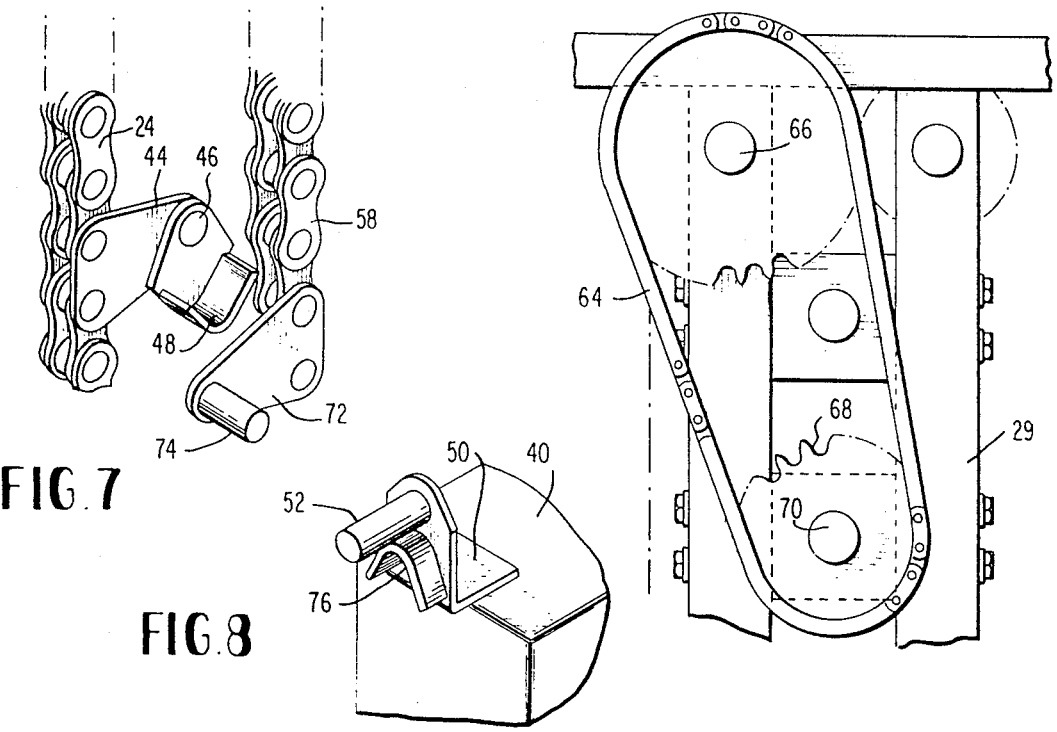

PRODUCTION IRRADIATOR

BACKGROUND OF THE INVENTION

1. Field of the Invention

This invention relates to improvements in irradiators, and more particularly to a continuous production irradiator which effectively utilizes radiation without waste, integrates radiation dosages horizontally and vertically, provides good shielding, and simplified loading and unloading.

2. Prior Art

It is known in the prior art to provide a conveyor for conveying materials in carriers past a radiation source in multiple spaced vertical runs for production irradiation. One of the factors affecting the design of production irradiators is the conservation of expensive radiation and space within the primary shielding volume and this frequently directs one to space the material to be irradiated close to the radiation source. Further, packages of material and carriers on the conveyor, if widely spaced, are wasteful of radiation. However, it is also essential that the material being irradiated be exposed to a uniform dosage. In one known effort to solve these problems, a conveyor having at least two vertical runs on each side of a radiation source carried carriers which were spaced approximately one carrier space apart in two vertical rows on each side of the source. The carriers moved intermittently so that the radiation was directed normally to either the carrier in the vertical line closest to the source or the carrier in the next vertical run. See U.S. Pat. No. 3,396,273. The intermittent drive arrangements required are complicated and likely to cause trouble, but more importantly, the arrangement is wasteful of irradiation as the packages in the vertical run of cans most remote from the irradiation source are less effectively irradiated than if they were in the source plaque.

When an attempt is made to keep conveyor product carriers close together and close to the source, difficulties arise, especially when the conveyor makes 180° turns. In conventional conveyor design the product carriers would have to be spaced an undesirable distance apart in order to provide clearance for the turns.

Depending upon the design of the radiation source used, the radiation dose pattern will vary. However, with the most efficient radiation sources, the radiation from the source is not uniform along the length of the package carriers. This could mean that packages near the center of the carrier will receive more radiation dosage than packages at the end of the carrier, an undesirable result. Moving the packages in the carrier vertically past the radiation source integrates any variation in radiation dose vertically, but in the case of a source plaque which is not shaped for uniformity of dose rate, there is also a need to integrate radiation dosage horizontally.

In loading of conveyors of prior art irradiators, there is quite a bit of movement of packages to get the packages on the conveyor that will carry them through the radiation space. Often two conveyors are used with two transfers of the packages to be irradiated and elaboraate shielding within the primary radiation shield. This is obviously undesirable if a single conveyor system could be devised which would allow loading directly into a conveyor carrier from an adequately shielded loading station within the primary radiation shield.

Another desirable feature of a production irradiator is the ability to control radiation dosage as desired for the particular packages of material being irradiated, and for this purpose among others, it is desirable to maintain positive control of the carrier.

SUMMARY OF THE INVENTION

The production irradiator of this invention provides a single simple conveyor running from a loading station within the primary shield to a radiation space through a simple yet quite effective short labyrinth bridge shield. Carriers are uniquely attached to the conveyor so that the center of moment of the carriers is always spaced apart from and perpendicular to the path of travel of the conveyor. This allows the carriers to be spaced quite close together vertically on vertical runs of the conveyor thus conserving radiation. The conveyor includes at least one vertical pass on each side of the radiation source with the carriers closely spaced vertically. Extension arms extending outwardly from the conveyor chains supporting the carriers allow for the closer spacing of carriers in adjacent positions by permitting even closely spaced carriers to undergo an outside turn. Even so, for a continuous conveyor of multiple vertical passes, every other turn would necessarily be an inside turn. Here, the extended arms would work a disadvantage. In this invention, a transfer arrangement is provided for transferring, prior to each inside turn, the carriers from the top of one vertical run to an adjacent succeeding vertical run where ordinarily such transfer could not be accomplished if closely spaced carriers remained on the extension arms. A loading and unloading station is well shielded by a bridge over the main cavity. The station provides means to load and unload packages by shifting them horizontally across the length of the carriers so that a single particular package may make several passes around the conveyor past the source plaque with one pass in each of several horizontal positions within the carrier thus integrating radiation dose horizontally as well as vertically.

BRIEF DESCRIPTION OF THE DRAWINGS

FIG. 5 is a detailed elevational view looking along line 5—5 of FIG. 4;

FIG. 6 is a elevational view showing the drive of the transfer device taken along line 6—6 of FIG. 5;

FIG. 7 is a detailed perspective view of the extension arms on the irradiation conveyor and transfer conveyor; and FIG. 8 is a perspective view of a bracket on the top end edge of a can.

DESCRIPTION OF THE PREFERRED EMBODIMENT

An irradiator for irradiating package P of material on a production basis is constructed with an enclosure or outer housing 12 of suitable radiation shielding material. A suitable source plaque 18 is supported in radiation space 16 by suitable means not shown. This source plaque may be a plate-like assembly of spaced rods of cobalt 60 or may take any other suitable form known in the art. It is arranged to allow it to be removed to a storage position and changed as desired, by known means not shown.

Figure 1:
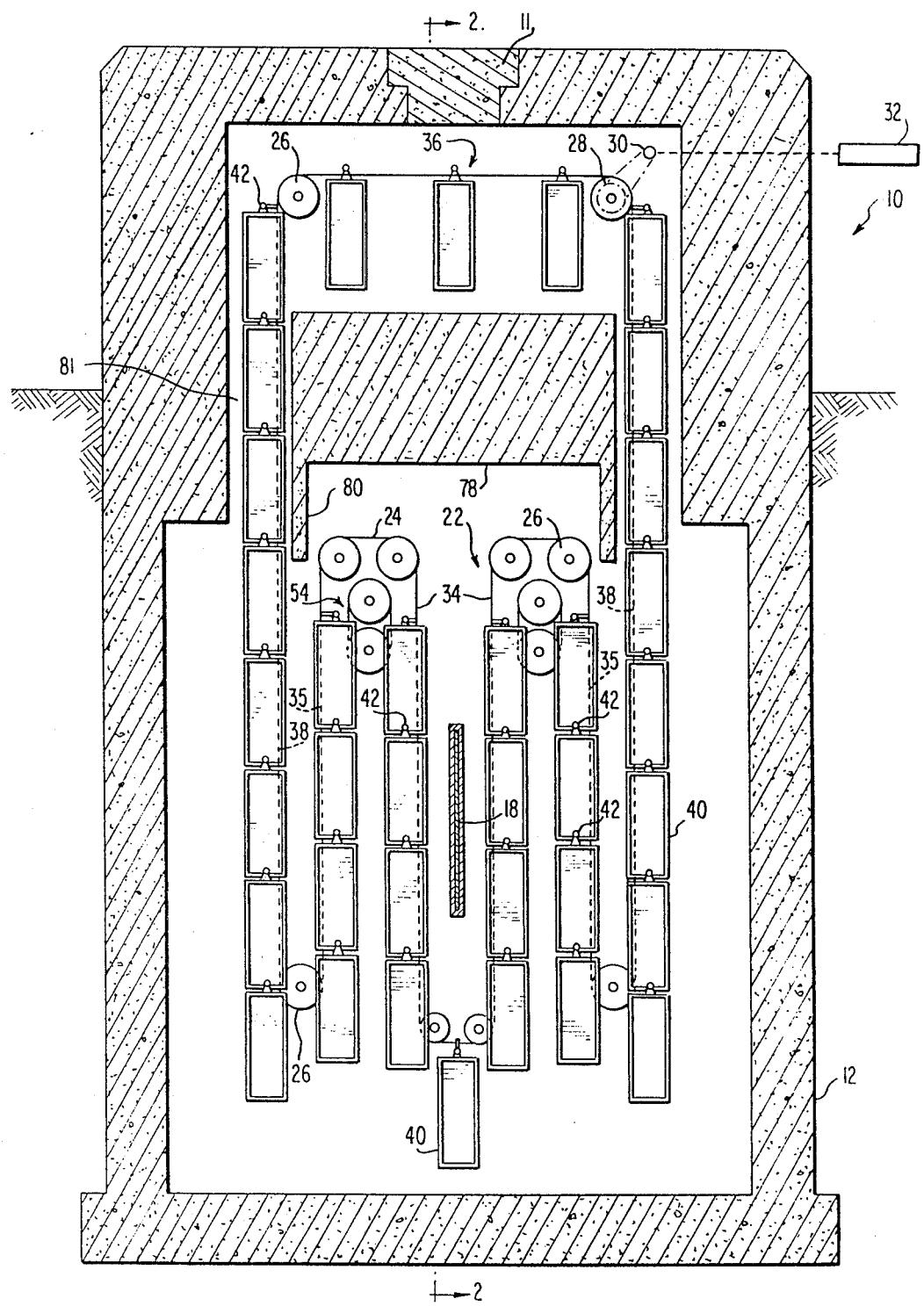
FIG. 1 is a sectional elevation view, partially schematic, showing the continuous production irradiator of this invention transporting carriers containing packages of material to be irradiated in closely spaced relationship past a radiation source.

An irradiation conveyor 22 is provided within the enclosure 12 and includes an endless chain 24 trained around various idler sprockets 26 and a suitable drive sprocket 28 as shown in FIG. 1. Chain guides, not shown, are provided as known in the art to guide the chain 24. The conveyor sprockets are all suitably journaled and supported from a framework 29. The conveyor is driven at a desired continuous speed through a drive shaft 30 connected to drive sprocket 28 from a variable speed driving means 32 such as a hydraulic motor.

As shown in the preferred embodiment, the conveyor has a number of vertical runs, and two vertical runs 34 are on each side of the source 18. Additional vertical runs 35 extend outwardly of runs 34 and there may be outer vertical runs 38 as shown.

Figure 2:
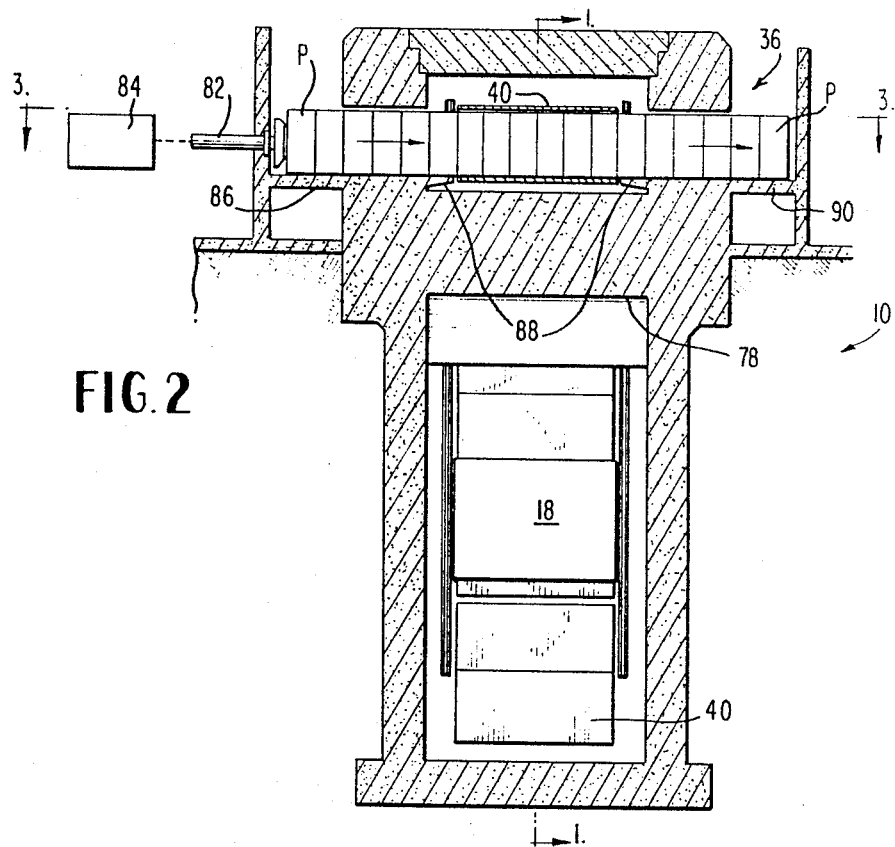
FIG. 2 is a sectional elevation taken along line 2—2 of FIG. 1 (note that FIG. 1 is taken along line 1—1 of FIG. 2)
Figure 3:
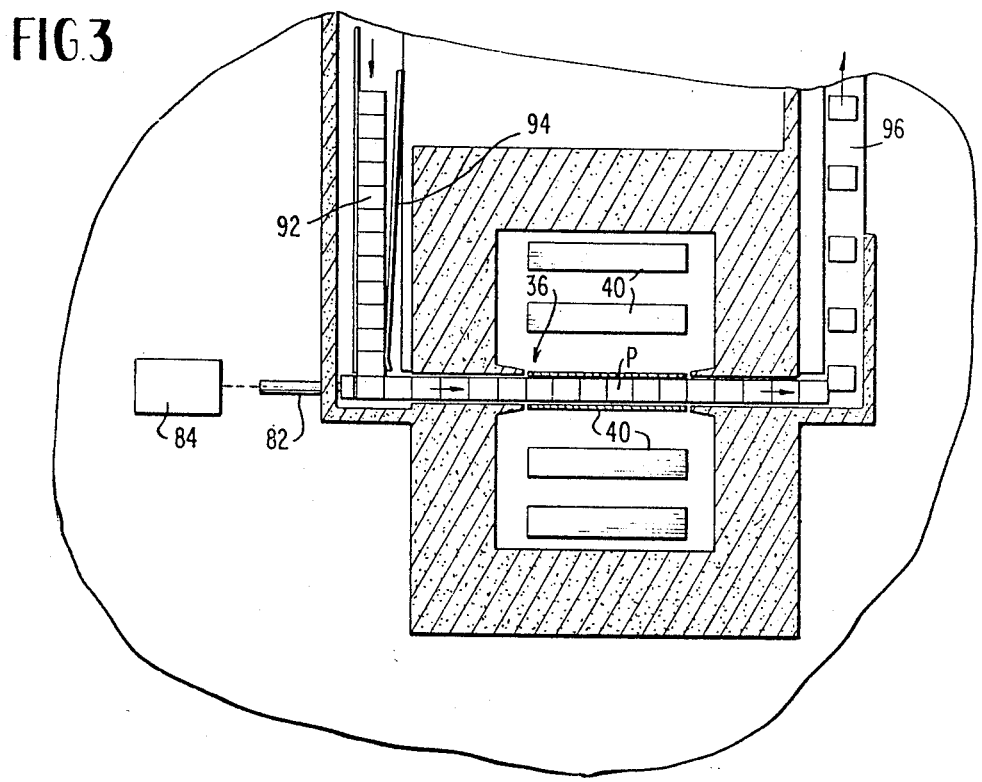
FIG. 3 is a sectional elevation taken along line 3—3 of FIG. 2.

A loading station 36 is positioned in the upper part of the enclosure 12 as shown particularly in FIGS. 1, 2 and 3 and the conveyor 22 extends through it.

The packages P of material to be irradiated are carried in hollow open-ended carriers 40 which in turn are carried by the conveyor 22. The carriers and conveyors are connected by means 42 shown in more detail in FIGS. 4, 5, and 6. At spaced positions along the length of conveyor 22, there are secured extension arms 44 which have a pivot shaft 46 at their outer ends mounting a cup 48. The outer top edges of each carrier 40 include a bracket 50 having an outwardly extending pin 52. The pin 52 is held in the pivotal cup 48 as shown, for example, in FIGS. 4 and 5 to effectively pivotally support the carriers from the extension arms along the path of the conveyor. The position of the extension arms is such that the top of one can and the bottom of another can are very close together, e.g., about 1 inch apart.

The sprockets are positioned as shown in FIG. 1 so that the innermost vertical runs 34 move the carriers very close to the source plaque 18. In order to conserve radiation in the vertical runs 34 the carriers 40 should be closely spaced in a vertical direction. However, if the closely spaced carriers are of any significant width, they will bump into each other making the bottom or outside turns between adjacent vertical runs. By positioning the center of moment of the carriers 40 at a distance frOm and normal to the direction of movement of the conveyor chain 24 this problem is overcome. This is accomplished by means of the extension arms 44, which in effect extend the radius of the outside or bottom turns and allowing the carriers to be closely positioned vertically in vertical runs.

Where there are also inside turns as in FIG. 1, the carriers could not normally mOve through these inside turns. This problem is even further accentuated by the use of the extension arm 44. This invention provides a transfer means 54 to transfer the carriers from the top of one vertical run to the succeeding vertical run. This transfer means 54 includes a transfer conveyor 56, see FIG. 4, with a chain 58 trained about an idler sprocket 60 and drive sprocket 62. The transfer conveyor 56 is driven at a predetermined speed faster than the irradiation conveyor 22 by means of a timing chain 64, see FIG. 6. The timing chain is trained over a sprocket attached to shaft 66 rigid with one of the idler sprockets 26 and over transfer drive sprocket 68 rigid with shaft 70 which also carries drive sprocket 62.

Figure 4:
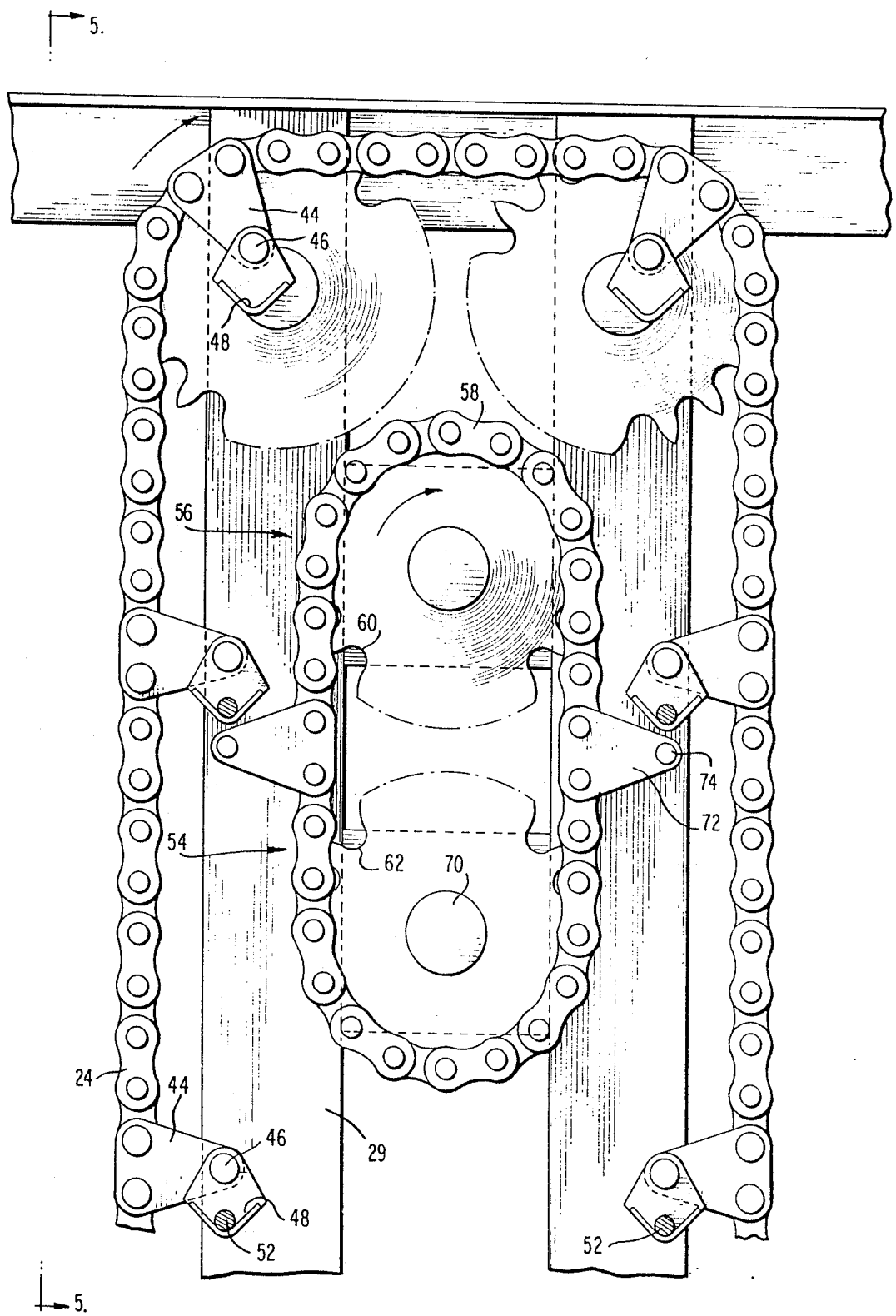
FIG. 4 is a detailed elevation of a portion of the irradiation conveyor and the transfer conveyor.

The transfer conveyor chain 58 also has an extension arm 72 which extends toward the irradiator conveyor chain 24 as shown for example in FIGS. 4 and 7. Extension arm 72 has an extending pin 74 which cooperates with an inverted cup 76 which is part of bracket 50 on the top of carrier 40, see FIG. 8. As a carrier nears the top of a vertical run and prepares for an inside turn to pass to a succeeding adjacent vertical run, the transfer conveyor moving at a speed faster than the irradiation conveyor will cause pin 74 to move up under inverted cup 76 and carry the carrier 40 in a short loop outside turn. After making the turn, the carrier 40 will be placed in the pivoted cup 48 on the adjacent vertical run.

A radiation shield bridge 78 may be built at the same time enclosure 12 is built and provides an effective labyrinth radiation shielding of the loading station by virtue of having itself in the path of any radiation from source 18 such that any radiation directed in a straight line from any portion of source 18 must bounce from three surfaces before reaching the loading station port. As shown in the arrangement of FIG. 1, this labyrinth may be extended further by radiation shielding legs 80 extending downwardly from the main body of the bridge shield 76 which is above the radiation space 16. Passages 81 for movement of the carriers and conveyor are kept purposely narrow in order that the bridge and walls may provide an effective labyrinth. In this type of labyrinth the product in the carriers 40 may provide substantial shielding in the labyrinth. For example, with a high density product the legs 80 may not be needed. Where low density materials are being handled the labyrinth needs to be longer and the legs 80 may be required.

At the loading station 36, packages P are loaded, preferably one or two at a time into open-ended carrier 40 by means of a pusher 82 operated by suitable drive means 84. The packages are resting on a platform 86 and are pushed into an open end of carrier 40 while being supported also on lip 88. At the same time, packages already in carrier 40 are pushed out the other end of carrier 40 onto an unloading platform 90. Leading to the loading platform 86 is a suitable loading conveyor such as a belt conveyor 92 having a package guide 94 and leading from the unloading platform 90 is an unloading belt conveyor 96, see FIG. 3.

It is believed the operation of the production irradiator of this invention is evident from the foregoing detailed description but a brief resume will now be given. Carriers 40 are positioned on conveyor 22 until they take the new position shown in FIG. 1, that is, no carriers at the top of adjacent vertical runs 34 and 35 but carriers at every other position. A suitable radiation plaque 18 is in radiation position as shown and packages P are loaded into the carriers 40. The drive motor 32 then drives the conveyor 22 in a continuous fashion at any desired speed to move the packages with the closely spaced carriers 40 in the vertical runs 34 closest to the source 18 and the cans in the next adjacent runs 35 and in the outer runs 38 close to each other. These carriers are closely spaced vertically and can still move around the conveyor turns by virtue of the unique extension arm and transfer arrangement shown in FIGS. 4–8 and described above. The loading station 36 is well shielded by the labyrinth formed by bridge shield 78, the cell walls and the port. The pusher 82 pushes new packages into carriers 40 positioned at the loading station and irradiated packages out onto unloading platform 98. The source plaque may be loaded to give a uniform dose along the length of the carrier and this may be optimum for low capacity operation where efficiency is not important. Preferably, for high capacity operation not all of the packages in a container are loaded or unloaded at once so that a package will pass by the radiation source first at one side of the container, then in the middle of the container, and then at the other side of the can before being unloaded. This integrates the radiation dosage horizontally while movement of the conveyor on the vertical runs integrates the radiation dosage vertically. This permits much more efficient use of the source material. The radiation dose rate administered may be controlled and by the strength of the source plaque 18 and the time in the radiation zone. The speed of the conveyor is selected to control the dose per pass.

We claim:

1. A production irradiator for use with a radiation source plaque, the irradiator comprising:
    a. an endless irradiation conveyor having at least two vertical runs, in close proximity to the radiation source,
    b. conveyor drive means for driving the conveyor,
    c. a loading station with a portion of the conveyor extending therethrough,
    d. a plurality of hollow carriers for carrying material to be irradiated,
    e. carrier and conveyor connecting means for connecting each of the carriers to the conveyor so that all carriers in a vertical run of the conveyor are closely spaced, and a line defined by the center of moment of the carriers during movement of the carriers on the vertical runs of the conveyor is spaced from and parallel to the same vertical run of the conveyor, the conveyor and connecting means including extension arms spaced apart along the conveyor, the extension arms are in one vertical run of the conveyor extending toward an adjacent vertical run of the conveyor, a bracket extending from each carrier, a portion of each bracket cooperating with a corresponding extension arm to pivotally hang each carrier from the corresponding extension arm,
    f. radiation bridge shield means between the radiation source and the loading station,
    g. and transfer means for transferring the carriers from the top of one vertical run to the top of a succeeding vertical run, the transfer means include a transfer conveyor positioned between succeeding vertical runs near the top of such runs and driven at a speed faster than the irradiation conveyor, the transfer conveyor having extending arms extending toward the extension arms of the irradiation conveyor in the vertical runs, the transfer conveyor extension arms cooperating with the portion of the brackets on the carriers to lift the carriers away from the arms of the irradiation conveyor of one adjacent vertical run and place the carriers in extension arms of the irradiation conveyor on the next succeeding adjacent vertical run.

2. A production irradiator as in claim 1 wherein the transfer conveyor extension arms have extending pins for cooperation with inverted cup shaped portions of the brackets on the carriers.

3. An irradiator for use with a radiation source, the irradiator comprising: a primary radiation shield shielding an interior space containing the radiation source, a conveyor system including a conveyor which makes at least two vertical runs through the radiation zone and a plurality of open ended containers carried thereby, a plurality of extension arms extending from the conveyor, a pivotal connection between the extension arms and each container, the conveyor system being entirely within the primary radiation shield and passing the radiation source and a loading station, transfer means for transferring containers from the top of one vertical run to the top of a succeeding vertical run, the transfer means includes a transfer conveyor driven in timed relationship and at a speed greater than the carrier conveyor, a loading port in the primary radiation shield at the loading station and aligned with the hollow open-ended containers, and a labyrinth shield between the radiation source and the loading station.

4. A production irradiator for use with a radiation source, the irradiator being of the type including: an endless irradiator conveyor having at least two vertical runs in close proximity to the radiation source means for driving the conveyor, a plurality of containers carried by the conveyor for holding the material to be irradiated, means for loading the conveyor at a loading station, with the improvements comprising; a suspension system for supporting the containers from the conveyor so that the containers are positioned immediately adjacent one another during the vertical runs of the conveyor, the suspension system including extension arms extending from the conveyor perpendicular to the vertical runs on the conveyor and the radiation source, and a pivotal connection between each extension arm and container so that the center of moment of each container moves in a path parallel to and offset from the vertical run of the container, and a transfer system for transferring each container from the top of one vertical run to another, the transfer system including a separate transfer conveyor driven in timed relation and faster than the irradiation conveyor.

5. A production irradiator as defined in claim 4 wherein the transfer conveyor includes extending arms extending toward the extension arms of the irradiation conveyor in the vertical runs, the transfer conveyor extension arms cooperating with the carriers to lift the carriers away from the extension arms of the irradiation conveyor of one adjacent vertical run and place the carriers in the extension arms of the irradiation conveyor on the next succeeding adjacent vertical run.

6. A production irradiator as defined in claim 5 wherein the extension arms are attached to the irradiation conveyor, and the pivotal connection is defined by a cup pivoted to an end of each extension arm which cup cooperates with a pin extending from a bracket mounted on each end of each container.

7. A production irradiator as defined in claim 6 wherein the containers are hollow and open ended and the loading station is shielded from the radiation source by a radiation bridge.

* * * * *